United States Patent
Moore, III et al.

(10) Patent No.: US 11,867,591 B2
(45) Date of Patent: Jan. 9, 2024

(54) BACKUP OXYGEN SUPPLY BOTTLE PRESSURE MEASUREMENT AND LEAK TEST TOOL

(71) Applicant: Lockheed Martin Corporation, Bethesda, MD (US)

(72) Inventors: James Robert Moore, III, Fort Worth, TX (US); Mark S. Osborne, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 262 days.

(21) Appl. No.: 17/096,649

(22) Filed: Nov. 12, 2020

(65) Prior Publication Data

US 2022/0146364 A1 May 12, 2022

(51) Int. Cl.
  *G01M 3/32* (2006.01)
  *H04L 67/12* (2022.01)

(52) U.S. Cl.
  CPC ........... *G01M 3/3209* (2013.01); *H04L 67/12* (2013.01)

(58) Field of Classification Search
  CPC .... G01M 3/3209; G01M 3/3272; H04L 67/12
  See application file for complete search history.

(56) References Cited

U.S. PATENT DOCUMENTS

| | | | |
|---|---|---|---|
| 4,441,357 A | 4/1984 | Kahn et al. | |
| 4,499,914 A | 2/1985 | Bernard et al. | |
| 4,651,728 A | 3/1987 | Gupta et al. | |
| 4,766,763 A | 8/1988 | Kurtz | |
| 6,439,032 B1 | 8/2002 | Lehmann | |
| 7,818,133 B2 | 10/2010 | Furuse | |
| 9,089,721 B1 | 7/2015 | Horstman et al. | |
| 10,545,067 B2 | 1/2020 | Phaff et al. | |
| 2016/0325122 A1 | 11/2016 | Contino et al. | |

FOREIGN PATENT DOCUMENTS

| | | | |
|---|---|---|---|
| CN | 108591820 A | | 9/2018 |
| EP | 2796848 B1 | | 12/2017 |
| JP | 57008432 A | | 1/1982 |
| JP | 2006214891 | * | 8/2006 |
| JP | 2009082782 | * | 4/2009 |

OTHER PUBLICATIONS

JP 2006214891, English translation (Year: 2006).*
JP 2009082782, English translation (Year: 2009).*

* cited by examiner

*Primary Examiner* — Kim T Nguyen
(74) *Attorney, Agent, or Firm* — Baker Botts L.L.P.

(57) ABSTRACT

In one embodiment, systems and methods include using a pressure measurement and leak test tool to measure the internal pressure of a container. A pressure measurement and leak test tool comprises a first side, a second side, a top end, a bottom end, and a front surface. The first and second side are disposed along the same plane opposite from each other, wherein the top and bottom end are coupled to the first and second side, wherein the top and bottom end are disposed opposite from each other, wherein the front surface is disposed on an edge defined by the first side, the top end, the second side, and the bottom end. The pressure measurement and leak test tool further comprises an electrical connector disposed on the top end, a power switch disposed on the front surface, and an information handling system comprising a display disposed in the front surface.

17 Claims, 4 Drawing Sheets

BACKUP OXYGEN SUPPLY BOTTLE PRESSURE MEASUREMENT AND LEAK TEST TOOL

TECHNICAL FIELD

This disclosure generally relates to inspection devices, and more specifically, to a pressure measurement and leak test tool for determining the internal pressure of a container and verifying that the container is not experiencing a gross leak.

BACKGROUND

Pressurized containers of oxygen gas are supplied to aircraft to be used in urgent situations. To ensure that each container is adequate for use, the containers are inspected inside of the aircraft as the equipment is incorporated into the aircraft. There is currently no tool, system, or method capable of inspecting and performing contents measurements of these pressurized containers outside of the aircraft.

SUMMARY

According to an embodiment, a pressure measurement and leak test tool comprises a housing, which comprises a first side, a second side, a top end, a bottom end, and a front surface. The first side and the second side are disposed along a same plane and opposite from each other. The top end and the bottom end are each coupled to the first side and the second side and are disposed opposite from each other. The front surface is disposed on an edge running a perimeter defined by the first side, the top end, the second side, and the bottom end. The pressure measurement and leak test tool further comprises an electrical connector disposed on the top end configured to couple to a bottle head assembly disposed on a container. The pressure measurement and leak test tool further comprises a power switch disposed on the front surface, and an information handling system comprising a display disposed in the front surface configured to perform a pressure measurement of the container while connected to the bottle head assembly.

According to another embodiment, a method of determining a pressure within a container comprises attaching an electrical connector disposed at a first end of a wired connection to an electrical connector disposed on the pressure measurement and leak test tool, wherein a second end of the wired connection is attached to a bottle head assembly disposed onto the container. The method further comprises generating an initial electrical signal corresponding to an initial pressure measurement with a pressure transducer of the bottle head assembly. The method further comprises transmitting the initial electrical signal to the pressure measurement and leak test tool through the wired connection and displaying a DC voltage of the initial electrical signal through a display disposed on the pressure measurement and leak test tool.

According to a further embodiment, a non-transitory computer-readable medium comprises instructions that are configured, when executed by a processor, to: generate an initial electrical signal corresponding to an initial pressure measurement with a pressure transducer of a bottle head assembly. The instructions are further configured to transmit the initial electrical signal to a pressure measurement and leak test tool through a wired connection, wherein the pressure measurement and leak test tool is electrically connected to the pressure transducer through the wired connection. The instructions are further configured to display a DC voltage of the initial electrical signal through a display disposed on the pressure measurement and leak test tool.

In the disclosed embodiments, a pressure measurement and leak test tool couples to a bottle head assembly that is attached to a pressurized container. The pressure measurement and leak test tool has a power supply that can provide power to both the tool and to a pressure transducer on the bottle head assembly that is configured to measure an internal pressure of the container. An information handling system of the pressure measurement and leak test tool may receive and process signals generated by the pressure transducer in order to display measurements to an operator during operations. These embodiments may provide for an operator to verify the internal pressure of a given container at any given time. Examples include but are not limited to: prior to shipping, prior to transportation to a final location, during periodic quality checks, prior to necessary usage, and combinations thereof.

Certain embodiments may include none, some, or all of the technical advantages discussed above. One or more other technical advantages may be readily apparent to one skilled in the art from the figures, descriptions, and claims included herein.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4, where like numbers are used to indicate like and corresponding parts.

Described herein are various systems, tools, and methods that provide for a tool to measure the pressure within a pressurized container of oxygen gas outside of an aircraft. The pressure measurement and leak test tool may be a hand-held device capable of electrically connecting to and/or coupling to a singular one of one or more of the pressurized containers to measure the internal pressure within each container to verify that each container is operational. The pressure measurement and leak test tool may further determine whether any pressurized containers are experiencing a gross leak and losing pressure.

Figure 1:
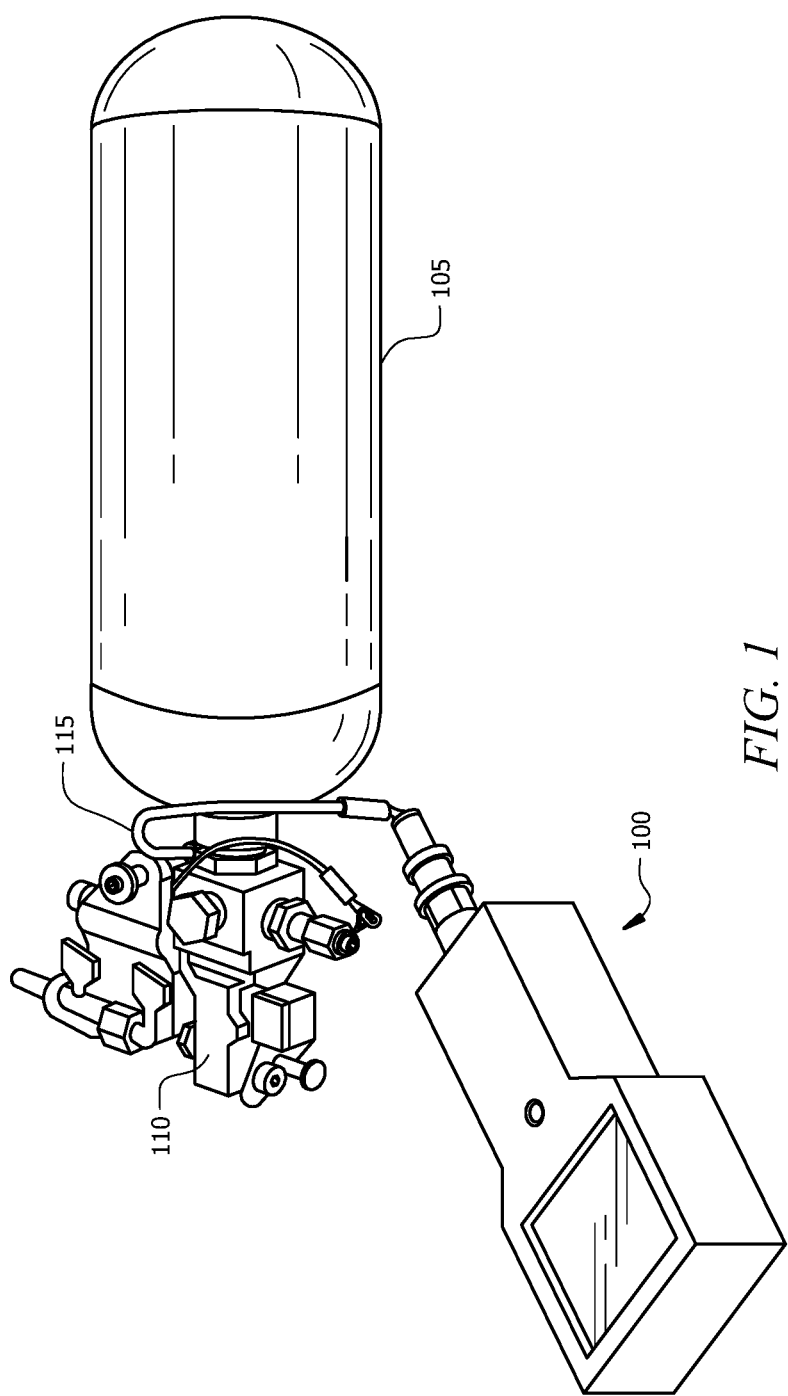
FIG. 1 illustrates an example pressure measurement and leak test tool and an example container, according to certain embodiments.

FIG. 1 illustrates a perspective view of a pressure measurement and leak test tool 100 coupled and electrically connected to a container 105. The pressure measurement and leak test tool 100 may be configured to measure the internal pressure of the container 105. In one or more embodiments, the pressure measurement and leak test tool 100 may be further configured to perform a leak test to determine if the container 105 is depressurizing. In one or more embodiments, the container 105 may be a pressure vessel configured to store a gas at a predetermined pressure. Without limitations, the container 105 may contain a volume of oxygen gas. In embodiments, the container 105 may be any suitable size, height, shape, and combinations thereof. Without limitations, the container 105 may generally be a cylindrical tank. The container 105 may comprise any suitable materials configured to withstand a predetermined internal pressure. Without limitations, the suitable materials may be metals, nonmetals, composites, and any combinations thereof.

As illustrated, a bottle head assembly 110 may be disposed on top of and coupled to the container 105. In embodiments, there may be an opening through the top of the container 105 to allow for fluid communication between an interior and an exterior of the container 105 of a given gas. As the bottle head assembly 110 is coupled to the top of the container 105, the interior of the container 105 may effectively be sealed. In embodiments, the bottle head assembly 110 may be any suitable size, height, shape, and combinations thereof, and the bottle head assembly 110 may comprise any suitable materials. Without limitations, the suitable materials may be metals, nonmetals, composites, polymers, and any combinations thereof. In one or more embodiments, the pressure measurement and leak test tool 100 may be coupled to the container 105 through the bottle head assembly 110. As illustrated, a wired connection 115 may couple and/or electrically connect the pressure measurement and leak test tool 100 to the bottle head assembly 110.

Figure 2:
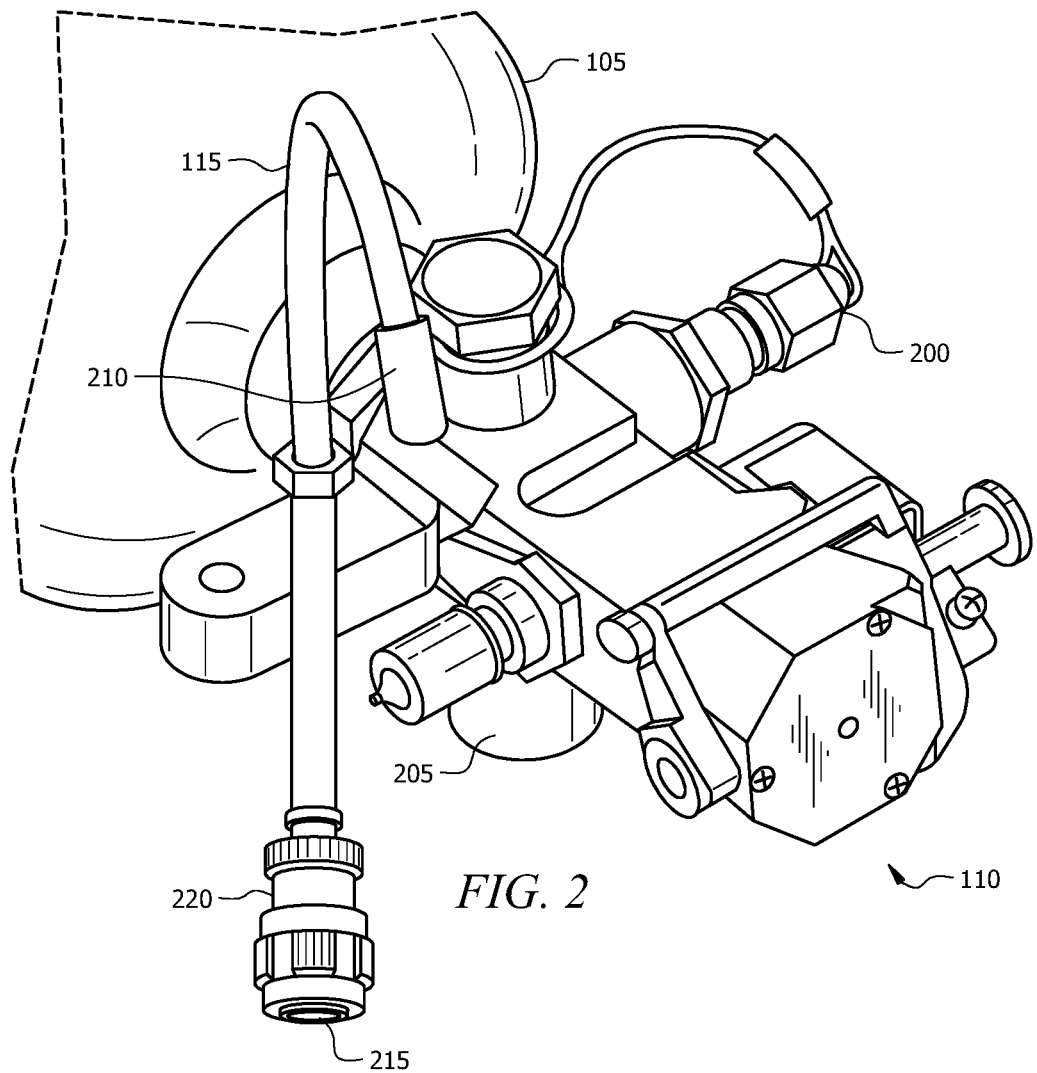
FIG. 2 illustrates an example bottle head assembly, according to certain embodiments.

FIG. 2 illustrates an embodiment of the bottle head assembly 110. The bottle head assembly 110 may be configured to seal the container 105, to pressurize the container 105, to depressurize the container 105, and any combinations thereof. In embodiments, the bottle head assembly 110 may comprise a servicing port 200 and a pressure transducer 205. The servicing port 200 may be disposed about any suitable location on the bottle head assembly 110. The servicing port 200 may be configured to couple to an external source and allow the flow of a gas (for example, oxygen), into the interior of the container 105. The servicing port 200 may be configured to only allow the flow of the gas one way, such as into the container 105. There may be other suitable components, such as valves, used within the bottle head assembly 110 to preserve the gas within the container 105. As the volume of gas flowing into the container 105 increases, the pressure within the container 105 may increase accordingly.

As illustrated, the pressure transducer 205 may be disposed near the servicing port 200. In other embodiments, the pressure transducer 205 may be disposed about any suitable location on the bottle head assembly 110. The pressure transducer 205 may be configured to measure the internal pressure of the container 105. Without limitations, any suitable pressure transducer may be used as the disclosed pressure transducer 205. The pressure transducer 205 may be configured to generate an electrical signal as a function of the pressure being measured. The bottle head assembly 110 may further comprise suitable electrical components for the transmission, processing, and combinations thereof of the electrical signals generated by the pressure transducer 205. For example, a first end 210 of the wired connection 115 may be coupled to the pressure transducer 205. The coupling of the wired connection 115 to the pressure transducer 205 may be either a direct or indirect connection. There may be an electrical connector 215 disposed at a second end 220 of the wired connection 115, wherein the electrical connector 215 may be configured to removably electrically connect and/or couple to the pressure measurement and leak test tool 100 (referring to FIG. 1). Without limitations, any suitable connector may be used as the electrical connector 215. By connecting the pressure measurement and leak test tool 100 to the bottle head assembly 110 through the wired connection 115, an electrical connection may be established.

Figure 3:
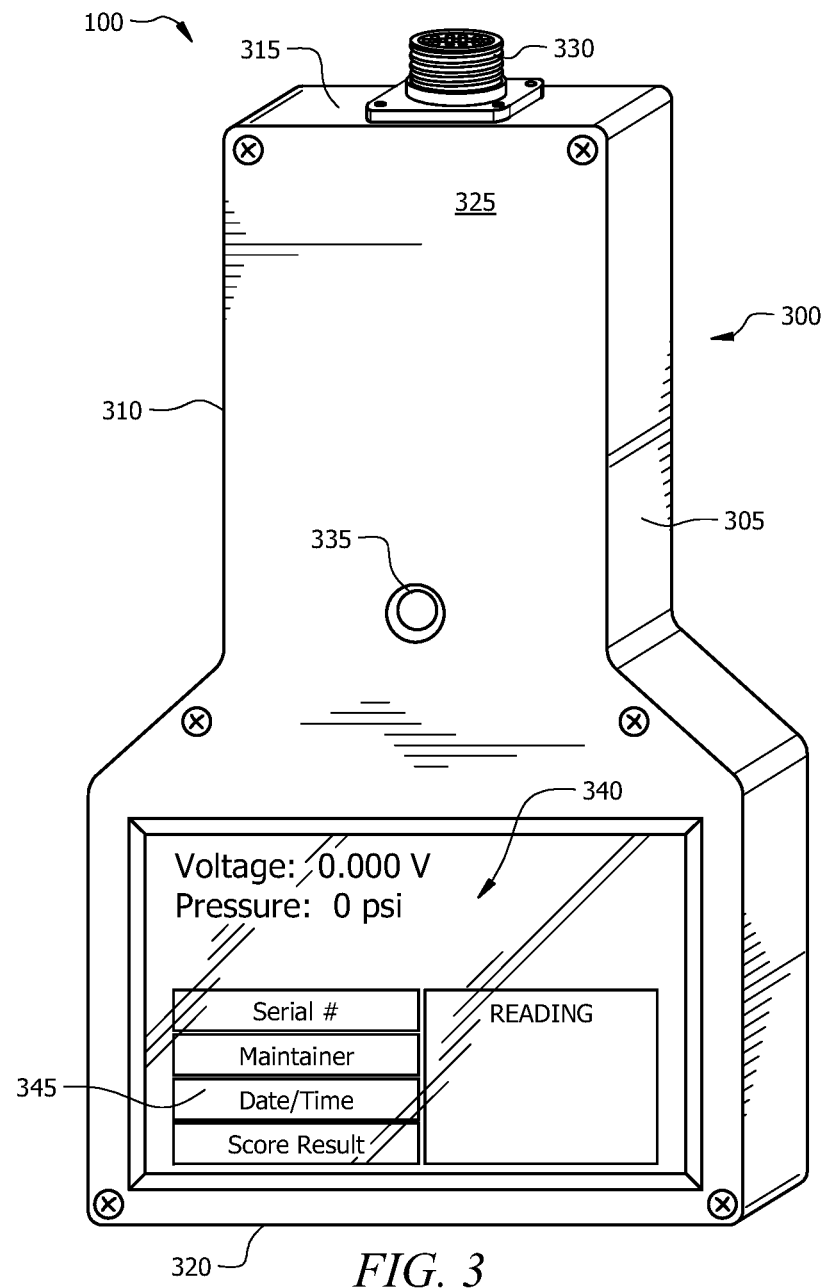
FIG. 3 illustrates an example perspective view of the pressure measurement and leak test tool in FIG. 1, according to certain embodiments.

FIG. 3 illustrates an embodiment of the pressure measurement and leak test tool 100. The pressure measurement and leak test tool 100 may be configured to process electrical signals received from the pressure transducer 205 (referring to FIG. 2), wherein the electrical signals may be indicative of measurements of the internal pressure of the container 105 (referring to FIG. 1). In further, embodiments, the pressure measurement and leak test tool 100 may be configured to activate the pressure transducer 205. In one or more embodiments, the pressure measurement and leak test tool 100 may be further configured to perform a gross leak test to determine if the container 105 is depressurizing. As illustrated, the pressure measurement and leak test tool 100 may comprise a housing 300. The housing 300 may be any suitable size, height, shape, and combinations thereof, and the housing 300 may comprise any suitable materials. The housing 300 may be configured to contain the necessary components for operation of the pressure measurement and leak test tool 100. In embodiments, these components may be disposed at least partially within, completely within, or on an external surface of the housing 300. As shown, the housing 300 may comprise a first side 305, a second side 310, a top end 315, a bottom end 320, a front surface 325, and a back surface (not shown).

The first side 305 and the second side 310 may be disposed at opposite sides of the housing 300. Both the first side 305 and the second side 310 may generally be disposed parallel to each other along the same plane. In certain embodiments, the first side 305 may mirror the second side 310. The top end 315 and the bottom end 320 may have a similar relationship as the first side 305 and the second side 310. As illustrated, the top end 315 may be disposed opposite to the bottom end 320. The top end 315 may be coupled to both the first side 305 and the second side 310 and may be disposed perpendicular to the first side 305 and the second side 310. Similarly, the bottom end 320 may be coupled to both the first side 305 and the second side 310 and may be disposed perpendicular to the first side 305 and the second side 310. The front surface 325 may be disposed about an edge running the perimeter defined by the first side 305, the top end 315, the second side 310, and the bottom end 320. The front surface may be disposed perpendicular to and orthogonal to each of the first side 305, the top end 315, the second side 310, and the bottom end 320.

As illustrated, there may be an electrical connector 330 disposed at the top end 315. While the electrical connector 330 is shown to be disposed about the center of the top end 315, the electrical connector 330 may be disposed about any suitable location at the top end 315. Further, the electrical connector 330 is not limited to the top end 315 and may be disposed about any suitable location on the housing 300. In embodiments, the electrical connector 330 may be configured to electrically connect and/or couple to the electrical connector 215 (referring to FIG. 2) that is disposed at the second end 220 (referring to FIG. 2) of the wired connection 115 (referring to FIG. 1). The electrical connector 330 may establish an electrical connection between the pressure measurement and leak test tool 100 and the bottle head assembly 110 (referring to FIG. 1) through the wired connection 115. Without limitations, any suitable connector may be used as the electrical connector 330. Once the electrical connection is established between the pressure measurement and leak test tool 100 and the bottle head assembly 110, the pressure measurement and leak test tool 100 may be capable of transmitting signals and/or instructions to the bottle head assembly 110 and vice versa.

There may further be a power switch 335 disposed at the front surface 325 of the housing 300. While the power switch 335 is shown to be disposed about the center of the front surface 325, the power switch 335 may be disposed about any suitable location at the front surface 325. Further, the power switch 335 is not limited to the front surface 325 and may be disposed about any suitable location on the housing 300. In embodiments, the power switch 335 may be configured to turn the pressure measurement and leak test tool 100 on and off for operation. When the power switch 335 is in a first position, an electrical circuit within the pressure measurement and leak test tool 100 may be disconnected, and the pressure measurement and leak test tool 100 may not be provided power to be functional. When the power switch 335 is in a second position, the electrical circuit within the pressure measurement and leak test tool 100 may be connected, and the pressure measurement and leak test tool 100 may be provided power to function.

The pressure measurement and leak test tool 100 may further comprise an information handling system 340 within the housing 300. The information handling system 340 may comprise components (described below in FIG. 4) capable of processing received electrical signals, transmitting instructions and/or signals, and displaying information related to the container 105 that is indirectly coupled to the pressure measurement and leak test tool 100. In embodiments, the information handling system 340 may comprise a display 345 configured to display the information to an operator. As shown, the display 345 may be disposed about the front surface 325 near the bottom end 320. In other embodiments, the display 345 may be disposed about any suitable location on the front surface 325 or anywhere else on the housing 300.

Figure 4:
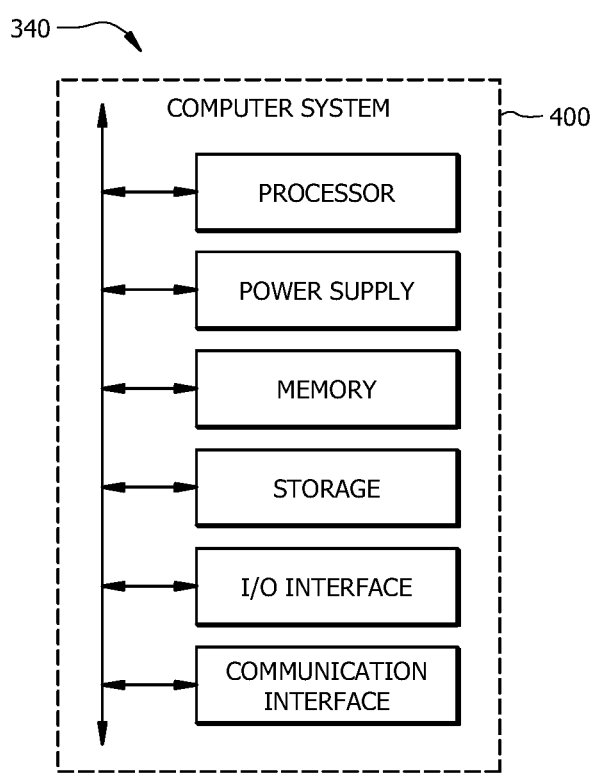
FIG. 4 illustrates an example information handling system of the pressure measurement and leak test tool in FIG. 3, according to certain embodiments.

FIG. 4 illustrates an example of elements 400 that may be included in information handling system 340, according to certain embodiments. For example, information handling system 340 may include one or more interface(s), power supply(ies), processing circuitry, memory(ies), and/or other suitable element(s). Interface receives input, sends output, processes the input and/or output, and/or performs other suitable operation. Interface may comprise hardware and/or software.

Power supply is an electrical device that supplies electric power to an electrical load. The primary function of a power supply is to convert electric current from a source to the correct DC voltage, current, and frequency to power the load. The power supply may provide power to certain components within the information handling system 340. In one or more embodiments, the power supply may be one or more batteries. The power supply may also provide functional power to the transducer assembly (for example, pressure transducer 205) to enable operation.

Processing circuitry performs or manages the operations of the component. Processing circuitry may include hardware and/or software. Examples of a processing circuitry include one or more computers, one or more microprocessors, one or more applications, etc. In certain embodiments, processing circuitry executes logic (e.g., instructions) to perform actions (e.g., operations), such as generating output from input. The logic executed by processing circuitry may be encoded in one or more tangible, non-transitory computer readable media (such as memory). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory (or memory unit) stores information. Memory may comprise one or more non-transitory, tangible, computer-readable, and/or computer-executable storage media. Examples of memory include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

With reference to FIGS. 1-4, during operations, an operator may couple and/or electrically connect the pressure measurement and leak test tool 100 to the container 105 by attaching to the electrical connector 215 disposed at the second end 220 of the wired connection 115, to the electrical connector 330, wherein the container 105 may be pressurized. The first end 210 of the wired connection 115 may be coupled to the pressure transducer 205 of the bottle head assembly 110 or may at least be electronically coupled to the pressure transducer 205, wherein the bottle head assembly 110 is disposed on top of and coupled to the container 105. The power switch 335 of the pressure measurement and leak test tool 100 may initially be in the first position where the pressure measurement and leak test tool 100 is not turned on. The operator may toggle or activate the power switch 335 to transition to the second position. In the second position, the pressure measurement and leak test tool 100 may be turned on as power is being supplied to the components of the pressure measurement and leak test tool 100 due to a completed electrical circuit. As the pressure measurement and leak test tool 100 is powered on, the power supply contained within the pressure measurement and leak test tool 100 may further supply power to the pressure transducer 205 through the wired connection 115.

The pressure transducer 205 may be actuated to measure the internal pressure of the container 105 and to generate a corresponding electrical signal when receiving supplied power. The generated electrical signal may be transmitted to the pressure measurement and leak test tool 100 via the wired connection 115. Once the pressure measurement and leak test tool 100 received the electrical signal from the pressure transducer 205, the pressure measurement and leak test tool 100 may process the received electrical signal, display information from the electrical signal through the display 345, and combinations thereof. In embodiments, the display 345 may display the DC voltage of the received electrical signal, wherein the DC voltage is a function of the internal pressure of the container 105. In other embodiments, the display 345 may further display the internal pressure within the container 105 after the information handling system 340 has processed the received electrical signal. With regards to the present disclosure, the pressure measurement and leak test tool 100 may be continuously measuring the internal pressure of the container 105 as long as power is being supplied to the pressure transducer 205. Accordingly, the display 345 may be configured to display updated information if the generated electrical signals from the pressure transducer change.

In one or more embodiments, the operator may input other data related to the specific container 105 coupled to the pressure measurement and leak test tool 100. Without limitations, the operator may input the serial number of the container 105, the date and time a pressure test (for example, an occurrence of measuring the internal pressure) was conducted, the results of the pressure test, the name and identification information of the operator who conducted the pressure test, the aircraft identification information, and combinations thereof. Any suitable process of inputting the data may be used. For example, the display 345 may have touch-screen capabilities, and the operator may manually type in the data through the display 345. Alternatively, a keyboard (or other input/output (I/O) device) may be coupled to the pressure measurement and leak test tool 100 for inputting data related to the specific container 105.

In further embodiments, the pressure measurement and leak test tool 100 may be configured to perform a leak test for the container 105. Once the pressure measurement and leak test tool 100 is properly connected to the container 105, the operator may initiate the leak test. In embodiments, the operator may initiate the leak test by selecting a start operation designated on the display 345. In these embodiments, the operator may select the operation through the touch-screen capabilities of the display 345 or may designate as such through a suitable I/O device. The pressure measurement and leak test tool 100 may actuate the pressure transducer 205 to generate an initial electrical signal and to transmit the initial electrical signal to the information handling system 340 of the pressure measurement and leak test tool 100, where the initial electrical signal corresponds to an initial pressure measurement. The information handling system 340 may wait a pre-determined period of time before actuating the pressure transducer 205 a subsequent time. Without limitations, the pre-determined period of time may be any suitable value within the range of from about one second to about ten minutes. In one or more embodiments, the pre-determined period of time may be about one minute, about five minutes, or about ten minutes.

Once the pre-determined period of time has elapsed, the pressure measurement and leak test tool 100 may actuate the pressure transducer 205 to generate a final electrical signal and to transmit the final electrical signal to the information handling system 340 of the pressure measurement and leak test tool 100, where the final electrical signal corresponds to a final pressure measurement. The information handling system 340 may be configured to determine a rate of change of the DC voltage of the electrical signals generated by the pressure transducer 205 over the pre-determined period of time. If the rate of change of the DC voltage of the electrical signals is greater than a threshold value, the information handling system 340 may alert the operator that the container 105 has a gross leak where the internal pressure is decreasing. Without limitations, the threshold value may be any suitable value within the range of from about one tenth of a DC Volt to about five DC Volts. In one or more embodiments, the threshold value may be about one half of a DC volt. The information handling system 340 may display a visual indication, such as a red light, on the display 345 that indicates that the container 105 has a gross leak. The information handling system 340 may further display an initial DC voltage from the initial electrical signal, a final DC voltage from the final electrical signal, the rate of change between the DC voltages, the threshold value, and combinations thereof through the display 345. In further embodiments, the information handling system 340 may display a pass/fail result based on the rate of change through the display.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A pressure measurement and leak test system comprising:
a bottle head assembly coupled to a container, the bottle head assembly configured to seal the container, to pressurize the container, and to depressurize the container, the bottle head assembly comprising:
a servicing port configured to allow flow of oxygen gas from an external source into an interior of the container; and
a pressure transducer configured to measure an internal pressure of the container comprising the oxygen gas; and
a pressure measurement and leak test tool configured to:
couple to the bottle head assembly;
perform a pressure measurement of the container comprising the oxygen gas;
perform a leak test of the container comprising the oxygen gas; and
simultaneously display information associated with the pressure measurement and the leak test on a display of the pressure measurement and leak test tool.

2. The pressure measurement and leak test system of claim 1, wherein the pressure measurement and leak test tool further comprises an internal power supply configured to provide power to the pressure transducer of the bottle head assembly.

3. The pressure measurement and leak test system of claim 1, wherein the pressure measurement and leak test tool is configured to:
receive an initial electrical signal from the pressure transducer; and
display a DC voltage of the initial electrical signal on the display of the pressure measurement and leak test tool.

4. The pressure measurement and leak test system of claim 3, wherein the pressure measurement and leak test tool is further configured to:
process the received initial electrical signal to determine an initial pressure measurement; and
display the initial pressure measurement after processing the received initial electrical signal.

5. The pressure measurement and leak test system of claim 3, wherein the pressure measurement and leak test tool is further configured to:
receive a final electrical signal corresponding to a final pressure measurement; and
display a DC voltage of the final electrical signal on the display.

6. The pressure measurement and leak test system of claim 5, wherein the pressure measurement and leak test tool is further configured to:
determine a rate of change between the received initial electrical signal and the received final electrical signal over a pre-determined period of time;
determine whether the rate of change exceeds a threshold value; and
display a leak test result based on the rate of change on the display.

7. The pressure measurement and leak test system of claim 6, wherein:
the pre-determine period of time is five minutes; and
the threshold value is 0.5 DC Volts.

8. The system of claim 1, wherein:
the display of the pressure measurement and leak test tool comprises touch-screen capabilities; and
the information associated with the pressure measurement and the leak test comprises:
an initial DC voltage from an initial electrical signal;
a final DC voltage from a final electrical signal;
a rate of change between the initial DC voltage and the final DC voltage; and
a threshold value associated with the rate of change.

9. A method of determining a pressure within a container, comprising:
attaching an electrical connector disposed at a first end of a wired connection to an electrical connector disposed on a pressure measurement and leak test tool, wherein a second end of the wired connection is attached to a bottle head assembly disposed onto the container, wherein the bottle head assembly is configured to seal the container, to pressurize the container, and to depressurize the container, the bottle head assembly comprising:
a servicing port configured to allow flow of oxygen gas from an external source into an interior of the container; and
a pressure transducer configured to measure an internal pressure of the container comprising the oxygen gas;
generating, by the pressure transducer, an initial electrical signal corresponding to an initial pressure measurement;
transmitting the initial electrical signal to the pressure measurement and leak test tool through the wired connection; and
simultaneously displaying information associated with a pressure measurement and a leak test on a display disposed on the pressure measurement and leak test tool.

10. The method of claim 9, further comprising toggling a power switch disposed on the pressure measurement and leak test tool to provide power to the pressure measurement and leak test tool and to the pressure transducer.

11. The method of claim 9, further comprising:
generating a final electrical signal corresponding to a final pressure measurement with the pressure transducer after a pre-determined period of time.

12. The method of claim 11, further comprising:
transmitting the final electrical signal to the pressure measurement and leak test tool through the wired connection; and
determining a rate of change between the initial electrical signal and the final electrical signal over the pre-determined period of time.

13. The method of claim 12, further comprising:
determining whether the rate of change exceeds a threshold value; and
displaying a leak test result based on the rate of change on the display.

14. The method of claim 9, further comprising:
processing the initial electrical signal to determine the initial pressure measurement with an information handling system of the pressure measurement and leak test tool; and
displaying the initial pressure measurement of the initial electrical signal on the display.

15. A system comprising:
a bottle head assembly configured to be coupled to a container, the bottle head assembly configured to seal the container, to pressurize the container, and to depressurize the container, the bottle head assembly comprising:
  a servicing port configured to allow flow of oxygen gas from an external source into an interior of the container; and
  a pressure transducer configured to measure an internal pressure of the container comprising the oxygen gas; and
a pressure measurement and leak test tool configured to:
  couple to the bottle head assembly;
  perform a leak test of the container by:
    receiving a first electrical signal from the pressure transducer, the first electrical signal corresponding to a first pressure measurement of the container;
    after a predetermined amount of time, receiving a second electrical signal from the pressure transducer, the second electrical signal corresponding to a second pressure measurement of the container;
    determining a rate of change between the received first electrical signal and the received second electrical signal; and
    displaying a leak test result based on the determined rate of change; and
  simultaneously display information associated with the first pressure measurement, the second pressure measurement, and the leak test on a display of the pressure measurement and leak test tool.

16. The system of claim 15, wherein the pressure measurement and leak test tool is further configured to accept data input by an operator into the pressure measurement and leak test tool.

17. The system of claim 16, wherein the data comprises one or more of:
  a serial number of the container;
  a date and a time of a pressure test;
  identification information of the operator; and
  aircraft identification information.

* * * * *